US012517782B2

(12) United States Patent
Allen et al.

(10) Patent No.: US 12,517,782 B2
(45) Date of Patent: Jan. 6, 2026

(54) METHOD AND APPARATUS FOR DETERMINING SHELF-LIFE OF ISSUE DETECTED USING DIGITIZED INTELLECTUAL CAPITAL

(71) Applicant: Cisco Technology, Inc., San Jose, CA (US)

(72) Inventors: Donald M. Allen, Colorado Springs, CO (US); Dmitry Goloubew, Waterloo (BE)

(73) Assignee: CISCO TECHNOLOGY, INC., San Jose, CA (US)

( * ) Notice: Subject to any disclaimer, the term of this patent is extended or adjusted under 35 U.S.C. 154(b) by 105 days.

(21) Appl. No.: 18/457,001

(22) Filed: Aug. 28, 2023

(65) Prior Publication Data

US 2025/0077337 A1 Mar. 6, 2025

(51) Int. Cl.
*G06F 11/00* (2006.01)
*G06F 11/07* (2006.01)
*G06F 11/30* (2006.01)

(52) U.S. Cl.
CPC ........ *G06F 11/0793* (2013.01); *G06F 11/008* (2013.01); *G06F 11/0781* (2013.01); *G06F 11/079* (2013.01); *G06F 11/3075* (2013.01); *G06F 11/3079* (2013.01)

(58) Field of Classification Search
CPC .............. G06F 11/079; G06F 11/0793; G06F 11/3075; G06F 11/3079; G06F 11/008; G06F 11/0781
See application file for complete search history.

(56) References Cited

U.S. PATENT DOCUMENTS

| 5,271,020 | A  | * | 12/1993 | Marisetty | H04L 1/0082 |
| | | | | | 714/751 |
| 8,423,397 | B2 | * | 4/2013 | Sitton | G06Q 10/04 |
| | | | | | 705/7.41 |
| 10,491,626 | B1 | | 11/2019 | Bhirud et al. | |
| 11,372,705 | B1 | * | 6/2022 | Minarik | G06F 11/3409 |
| 12,079,066 | B1 | * | 9/2024 | Neogi | G06F 11/008 |
| 2005/0166089 | A1 | * | 7/2005 | Ito | G06F 11/079 |
| | | | | | 714/E11.026 |
| 2014/0310564 | A1 | * | 10/2014 | Mallige | G06F 11/0751 |
| | | | | | 714/47.1 |

(Continued)

*Primary Examiner* — Bryce P Bonzo
*Assistant Examiner* — Gabriella Kanani Shelton
(74) *Attorney, Agent, or Firm* — Edell, Shapiro & Finnan, LLC

(57) ABSTRACT

Methods are provided for determining decay rates and/or shelf-lives of intellectual capital (IC) detected issues for only performing actions for expired or about to expire IC detected issues. Specifically, the methods involve performing one or more data collections that include data relating to one or more of a configuration of a computing system or an operation of the computing system and detecting an issue in the computing system based on the data. The issue relates to an anomaly in one or more of the configuration of the computing system or the operation of the computing system. The methods further involve determining a shelf-life for the issue, where the shelf-life indicates an estimated duration of the issue existing in the computing system before redetecting whether the issue is still present and adjusting a next data collection of the one or more data collections based on the shelf-life of the issue.

20 Claims, 5 Drawing Sheets

(56) References Cited

U.S. PATENT DOCUMENTS

| | | | |
|---|---|---|---|
| 2016/0070634 A1* | 3/2016 | Shirlen | G06F 11/3495 714/45 |
| 2017/0154475 A1 | 6/2017 | Lam et al. | |
| 2017/0213142 A1 | 7/2017 | Kaluza et al. | |
| 2019/0294987 A1* | 9/2019 | Luan | G01M 13/003 |
| 2020/0065213 A1* | 2/2020 | Poghosyan | G06F 11/0793 |
| 2022/0070051 A1 | 3/2022 | Mortensen et al. | |
| 2022/0156138 A1* | 5/2022 | Hunter | G06F 11/0793 |
| 2022/0180202 A1 | 6/2022 | Yin et al. | |
| 2022/0198357 A1 | 6/2022 | Krishnaswamy et al. | |
| 2022/0231928 A1 | 7/2022 | Allen et al. | |

* cited by examiner

METHOD AND APPARATUS FOR DETERMINING SHELF-LIFE OF ISSUE DETECTED USING DIGITIZED INTELLECTUAL CAPITAL

TECHNICAL FIELD

The present disclosure generally relates to computer networks and systems.

BACKGROUND

Networks and application deployments, collectively computing systems, continue to increase in complexity. Consequently, management systems that monitor the health and performance of computing system deployments are also becoming more diversified, complex, and numerous. It is estimated that between ten to twenty percent of resources that are allocated to operating deployed networks and services, are allocated to data collections and analysis. Traditional methods of collecting telemetry and configuration data involve comprehensive gathering and analysis that further burden resources.

DETAILED DESCRIPTION OF EXAMPLE EMBODIMENTS

Overview

Figure 1:
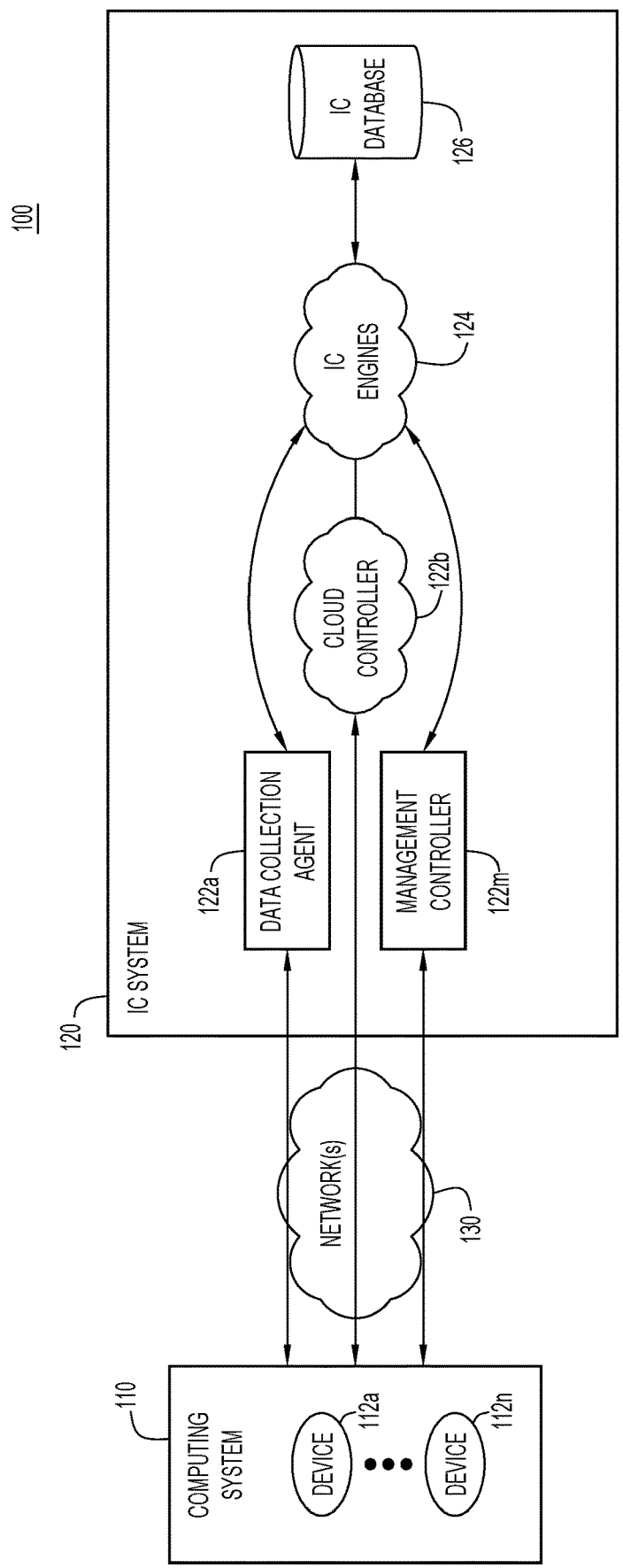
FIG. 1 is a block diagram of an environment in which a digitized Intellectual Capital (IC) system is deployed for detecting issues in a computing system based on adjusted data collections, according to an example embodiment.

Techniques presented herein provide for determining decay rates and/or shelf-lives of intellectual capital (IC) detected issues for performing actions only for expired or about to expire IC detected issues.

In one form, the methods involve performing one or more data collections that include data relating to one or more of a configuration of a computing system or an operation of the computing system. The methods further involve detecting an issue in the computing system based on the data. The issue relates to an anomaly in one or more of the configuration of the computing system or the operation of the computing system. The methods further involve determining a shelf-life for the issue. The shelf-life indicates an estimated duration of the issue existing in the computing system before redetecting whether the issue is present in the computing system. The methods further involve adjusting a next data collection of the one or more data collections based on the shelf-life of the issue.

Example Embodiments

When issues or problems are detected in a computing system, actions are performed such as data collections and analysis of the collected data to determine causes for the issue and/or to remediate the issue (e.g., troubleshooting). Data collections and analysis consume valuable network and compute resources. Methods are provided herein that can be more precise in the collection and analysis of data that support both requirements of an enterprise (e.g., properly functioning computing system and/or enterprise network) and those of analytics engines.

One method involves targeted data collections using digitized Intellectual Capital (IC) in a form of code modules that detect issue(s) in a computing system. IC code modules typically detect a particular issue in a particular environment. The issue in the computing system may relate to error conditions, potential error conditions, and/or best practices in configuration. The issue relates to an anomaly (or discrepancy) in configuration and/or operation of the computing system. Typically, an IC engine executes multiple IC code modules against the computing system to search for multiple issues at a time. In one instance, data collection may involve collecting telemetry and/or configuration data related to a particular issue i.e., by executing a particular IC code module. In yet another instance, a data collection may involve collecting telemetry and/or configuration data related to multiple issues i.e., by executing corresponding IC code modules, involving additional data (collected in a single one data collection).

IC code modules (machine executable issue detections), extend the reach of human knowledge more broadly in a network environment by enabling automated identification of present and/or potential issues or problems that could impact the availability of network services. Converting human knowledge or even machine generated knowledge, such as anomaly detection, is context-specific and the data collections are thus targeted for data to detect a particular issue in the computing system. The issue is typically a machine identifiable issues that can be detected with available output i.e., a signature of the issue (symptoms indicative of the issue). For example, an IC code module may be executed periodically (e.g., proactively) or on demand (e.g., in support of specific tasks). Typically, an IC code module is executed to determine whether it is applicable for a particular context (e.g., device, operating system version, role in the network, etc.) for at least some part of signature detection (e.g., accessing the signature or executing precondition logic). If the IC code module passes the preconditions to be applicable to a particular context, the detection logic in the IC code module may be executed, triggering targeted data collection from the computing system e.g., specific telemetry data values that indicate symptoms of an existence of a particular issue i.e., an IC result.

While targeted data collections using the IC engine helps to reduce the consumption of valuable network and/or compute resources, it would be preferable for data collections to be more surgical. The number of IC code modules grows exponentially (diagnose new issues, variations, deviations, etc.), resulting in an increase in the consumption of network and/or compute resources. The techniques presented herein may reduce consumption of network and/or compute resources by adjusting data collections for various issues i.e., IC results.

Specifically, the techniques presented herein provide a method of adjusting the frequency of data collections based on a shelf-life of each detected issue(s). The techniques presented herein consider a length of time that a detected issue has relevance to network management and/or computing system by calculating the shelf-life of the detected issue and thus, redetecting and reanalyzing the detected issue only when the shelf-life of the detected issue has decayed to a predetermined threshold value (approximately expired shelf-life). The predetermined threshold value is a decay point where there is a reasonable probability that the state of the detected issue changed.

The techniques presented herein may skip next data collection for the detected issue based on the shelf-life. The shelf-life of an IC result (detected issue) is a product of different factors used when calculating a decay rate of the IC result. The different factors may include a frequency of a change in the data used to identify the presence of an issue (symptoms), the frequency that the data is/can be obtained (collection), the likelihood that if a problem is present that it can be detected (detectability) using the data set, time since initial detection, and the likelihood that the problem will be fixed without an active response (self-remediation). The techniques presented herein calculate the shelf-life of an IC-detected issue using one or more of these factors e.g., by averaging probabilities with respect to these factors.

As a result, an enterprise computing system and/or network management systems are configured to direct data collection(s) as a function of the issues detected and the likelihood that the issue still exists. The network management systems do not need to collect the data regularly or periodically and perform the detection or redetection regularly or periodically i.e., at specific intervals.

Additionally, downstream consumption of redundant alarms/events is removed. The next data collection may be set to be approximately at an expiration of the shelf-life for a particular issue. The expiration of the shelf-life is indicative of the issue being remediated and/or no longer being present in the computing system. Moreover, the next data collection (regularly scheduled at a predetermined interval) may be skipped or the collection of data may occur without collecting data related to the detected issue, while the shelf-life of the issue is active. Active shelf-life means that the issue is still present in the computing system. While various ways for collecting data from a computing system may be available, the techniques presented herein identify the data to be collected (perform targeted data collections for issues) and determine when to collect the identified data based on shelf-life and/or decay rate of the issue.

By way of an analogy, the shelf-life of food is typically not calculated but is observed. A food product (and ingredients) is produced and is then observed at different intervals (depending on the food type and the preservation method) over time to determine when the product has spoiled (not fit for consumption). The expiration date is calculated for each production run of a product using the manufacturing date and its shelf-life. The food product uses a fixed shelf-life to establish an expiration date, which is then the same across all production runs.

On the other hand, the techniques presented herein use different factors associated with detectability of an issue when calculating the shelf-life such as data update and sampling frequency. The shelf-life is specific to the detected issue i.e., a specific date/time is calculated for each issue identified. In addition, a user or an operator may set a level (a predetermined threshold) at which the user considers the freshness of the IC result (detected issue) as not "consumable", resulting in a longer or shorter shelf-life based on enterprise priorities. The techniques presented herein generate a rate of decay, which is atypical for tradition shelf-life calculations.

For example, the shelf-life of pharmaceuticals is calculated through sampling of the drug in two ways: a long term storage at room temperature and accelerated storage conditions. This is a derivation of the food shelf-life method but measures are taken of the manufactured drug over time and are used to establish an expiration date for the drug.

As another example, a battery shelf-life is calculated based on a rate of discharge, which varies depending on the battery system but is consistent across the battery system. Discharge rates for Nickle-based and Lithium-based systems have a different decay rate for the first 24 hours (10-15% and 5%, respectively) and then a rate per month decay rate after (10-15% and 1-2%, respectively). Rates of discharge for the battery system further vary as a function of the storage temperature for the battery. While shelf-life for the battery system is calculated and used by shippers and warehouses, it is not based on per battery perspective nor is the storage temperature considered.

The techniques presented herein, on the other hand, consider factors that impact the shelf-life of a detected issue. The shelf-life for an issue detected by digitized knowledge can vary broadly as a function of multiple factors. Some example embodiments are described below.

FIG. 1 is a block diagram of an environment 100 in which a digitized Intellectual Capital system (IC system) is deployed for detecting issues in a computing system based on adjusted data collections, according to an example embodiment. The environment 100 involves the computing system 110 and an IC system 120 that communicate using network(s) 130.

The computing system 110 includes network/computing equipment and software at various enterprise sites or in cloud deployments of an enterprise. For simplicity, the network/computing equipment and software are depicted as devices 112a-n.

The notations 1, 2, 3, . . . n; a, b, c . . . n; "a-n", "a-d", "a-f", "a-g", "a-k", "a-c", and the like illustrate that the number of elements can vary depending on a particular implementation and is not limited to the number of elements being depicted or described. Moreover, these are only examples of various components, and the number and types of components, functions, etc. may vary based on a particular deployment and use case scenario. For example, the computing system 110 may involve one enterprise network and/or multiple enterprise networks and will vary based on a particular deployment and use case scenario.

The devices 112a-n are resources or assets of an enterprise (the terms "assets" and "resources" are used interchangeably herein). The devices 112a-n may be physical assets and/or virtual assets in one or more enterprise networks.

The devices 112a-n may include any type of network devices or network nodes such as controllers, access points, gateways, switches, routers, hubs, bridges, gateways, modems, firewalls, intrusion protection devices/software, repeaters, servers, and so on. The devices 112a-n may further include endpoint or user devices such as a personal computer, laptop, tablet, a server, or other computing devices configured to process data, host applications, etc.

The devices 122*a-n* may further include Internet of Things (IoT) devices. The IoT devices may include appliances, sensors, or other embedded devices. The devices 112*a-n* may further include virtual nodes such as virtual machines, containers, point of delivery (POD), and software such as system software (operating systems), firmware, security software such as firewalls, and other software products. The devices 112*a-n* may be in a form of software products that reside in an enterprise network and/or in one or more cloud(s).

For example, a first device 112*a* may be a network device, a second device 112*b* (shown in FIG. 2) may be a computing device that performs one or more computing functions and/or hosting function of an enterprise network, and a third device 112*n* may be an IoT device. This is but one non-limiting example and number and types of devices will vary depending on a particular computing system and/or enterprise network(s) deployment and use case scenario.

In one example embodiment, the devices 112*a-n* may represent information technology (IT) environment of an enterprise. A network technology is a computing-based service or a solution that solves an enterprise network or a computing problem or addresses a particular enterprise computing operation. The network technology may be offered by a service provider to address aspects of information technology (IT). Some non-limiting examples of a network technology include access policies, security and firewall protection services, software image management, endpoint or user device protection, network segmentation and configuration, software defined network (SDN) management, data storage services, data backup services, data restoration services, voice over internet (VoIP) services, managing traffic flows, analytics services, etc. Some network technology solutions apply to virtual technologies or resources provided in a cloud or one or more data centers. The network technology solution implements a particular enterprise outcome and is often deployed on one or more of the devices 112*a-n*.

For example, an enterprise network may include dispersed and redundant sites to support highly available services (e.g., network at various geographic locations). These enterprise sites include the devices 112*a-n*, which may be different hardware and software that host network services use for the enterprise services (e.g., product families, asset groups). Different types of equipment run different features and configurations to enable the enterprise services.

The devices 112*a-n* provide to the IC system 120, via telemetry techniques, data about their operational status and configurations so that the IC system 120 is updated about the operational status, configurations, software versions, etc. of each instance of the devices 112*a-n*.

The IC system 120 obtains data from the computing system 110 and detects issues in the computing system 110. The IC system 120 includes a plurality of data collection agents 122*a-m*, IC engines 124, and an IC repository (IC database 126).

Specifically, each device or group of devices in the computing system 110 may encounter different issues. These issues may involve network related problems or potential problems. Network related problems may include an outage, a latency problem, a connectivity problem, a malfunction of the network device or software thereon, and/or incompatibility or configuration related problems. Issues may involve defects, obsolescence, configurations, workarounds, network patches, network information, etc. Issues may relate to warranties, licenses, or alerts e.g., for a particular configuration or upgrade. The IC database 126 stores individual code modules, each specific to detect a particular issue in the computing system 110.

In one example, the IC database 126 may be one or more memory devices configured to store electronic data and may include multiple devices for redundancy, reliability, speed, and/or bandwidth. The IC database 126 is an IC signatures library that identifies device data to collect for a particular issue. Signatures may include details about an issue to be detected, types of data to collect (symptoms), pre-conditions such as devices of the computing system 110 to which data collections apply, rules for determining if the issue is present in computing system 110, and/or remediating actions to remediate or workaround the detected issue. The code modules are provided to the IC engines 124 for execution.

In one example, the IC engines 124 may be one or more processors configured to obtain data from the computing system 110 and run one or more code modules from the IC database 126. The IC engines 124 use signatures from the IC database 126 to perform targeted data collections based on context and shelf-life of detected issues. The context may be determined using information about the computing system 110 and attributes provided in the signatures e.g., applicable to device type A, software version B, etc. The IC engines 124 control the plurality of data collection agents 122*a-m* to collect data from the computing system 110 and execute code modules (IC) using data collected from the computing system 110 to detect issue(s).

Specifically, network and application configurations and operational issues are detected based on the presence or absence of a defined set of symptoms. Symptoms are identified using data acquired from the devices 112*a-n*. The frequency of data changes impacts the frequency with which a symptom can be detected. For example, a problem symptom based on data that changes every second has a very short shelf-life (i.e., less than a second), whereas a problem symptom that is based on a configuration parameter that changes very infrequently has a longer shelf-life (e.g., more than a month).

When an issue is detected, the IC engines 124 use the shelf-life for the issue to adjust data collections. The IC engines 124 may skip collecting data and executing code modules for detecting issues with an active shelf-life (e.g., for a configuration related issue). That is, the IC engines 124 adjust data collections to only collect data for relevant code modules (ICs). Relevant code modules (IC) are based on total code modules minus code modules for detected issues with an active shelf-life. In one example embodiment, the shelf-life for various issues may be determined by one or more other entities such as the cloud controller 122*b*, an external entity not shown, and then provided for use to the IC engines 124.

The plurality of data collection agents 122*a-m* collect data from computing system 110 (devices 112*a-n*) based on instructions from the IC engines 124. Data collected by the plurality of data collection agents 122*a-m* may include configuration data representing various configuration parameters such as enabled and disabled features. The data may further include telemetry data related to operating state of the devices 112*a-n* e.g., quality of service, available bandwidth, available memory, compute power, etc.

In one example embodiment, the plurality of data collection agents 122*a-m* may include a data collection agent 122*a*, a cloud controller 122*b*, and a management controller 122*m*. These are just some non-limiting examples of data collection devices. Type and number of collection devices may vary based on a particular deployment and use case scenario. Further, while the plurality of data collection agents 122a-m are depicted as part of the IC system 120, the plurality of data collection agents 122a-m may be separate entities external to the IC system 120 that provide the collected data to the IC system 120 via the network(s) 130.

The network(s) 130 include one or more networks such as, but not limited to, local area network (LAN, wide area network (WAN) (e.g., the Internet). The network(s) 130 is a network infrastructure that enables connectivity and communication between the computing system 110 and the IC system 120.

Figure 2:
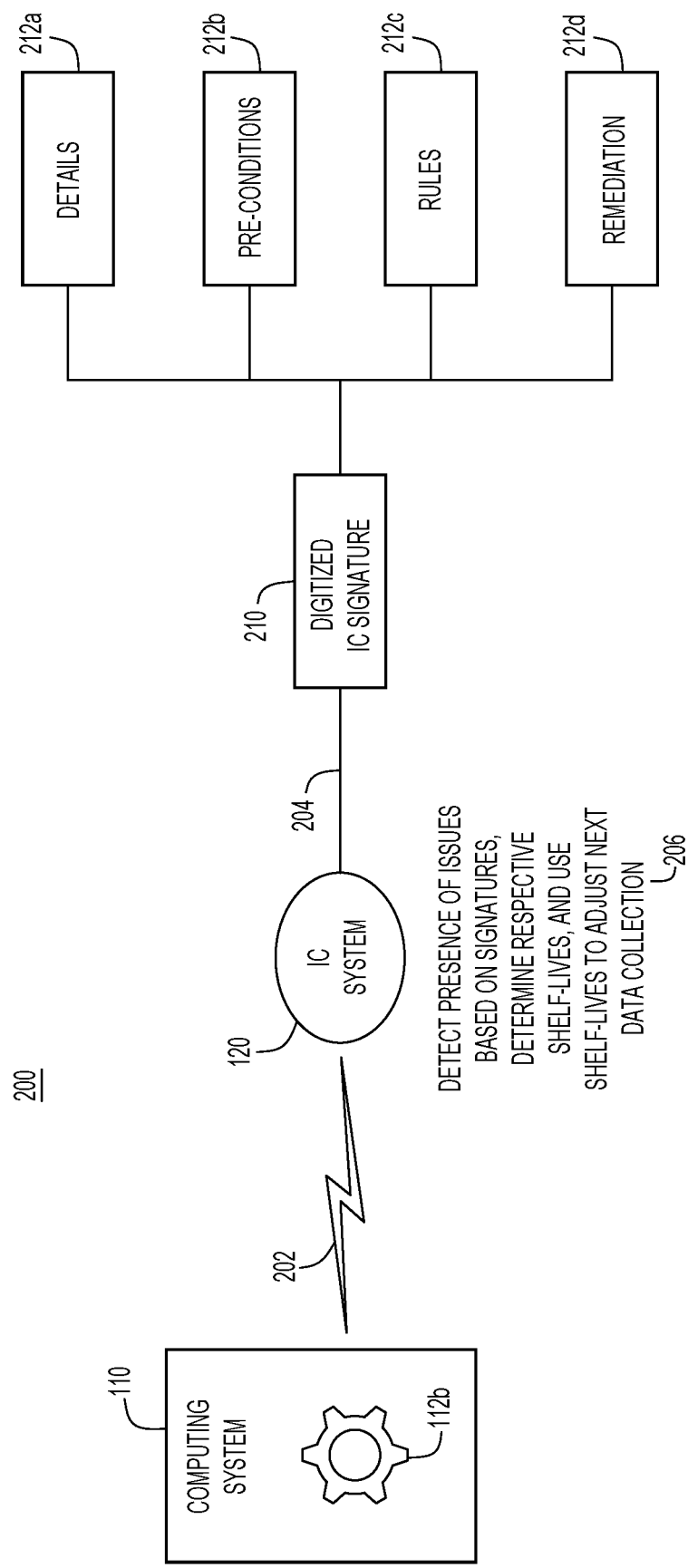
FIG. 2 is a diagram illustrating an environment in which the IC system is using shelf-life of each detected issue for performing a next data collection, according to an example embodiment.

With continued reference to FIG. 1, FIG. 2 is a diagram illustrating an environment 200 in which the IC system 120 of FIG. 1 is using shelf-life of each detected issue for performing next data collection, according to an example embodiment. The environment 200 involves the second device 112b and the IC system 120.

At 202, the IC system 120 obtains asset related data from the second device 112b. The asset related data may be obtained via one of the plurality of data collection agents 122a-m of FIG. 1 e.g., via a controller or a data collection agent. In one example embodiment, the data may be collected by an IC engine via a direct connection with the second device 112b.

At 204, the IC system 120 also obtains IC code modules for issues to detect in the second device 112b. For example, an operator or a user, via a network management system, may set issues to be monitoring in the second device 112b e.g., misconfigured parameters, security alerts, network bugs, etc. That is, the issues may involve network issues and/or configuration related issues, defined in digitized IC signatures. That is, the IC system 120 obtains a digitized IC signature 210, which includes attributes 212a-d for performing a targeted data collection.

The attributes 212a-d include a description for the digitized IC signature 210 (details 212a). The details 212a may include a signature name, a unique identifier, a description of a product family that is impacted by the issue, an issue type, a severity of the issue, an impact of the issue to the IC system 120 and/or the second device 112b, a general description, etc. The details 212a include context for the issue (e.g., what type of devices the issue may occur in) and identify data to collect (e.g., telemetry data and/or configuration parameters).

The attributes 212a-d may further include pre-conditions 212b, which is a detection logic for detecting the issue. The pre-conditions 212b include logic to determine if the digitized IC signature 210 is applicable to the second device 112b. The pre-conditions 212b may include processor identifier (PID) check and/or operating system (OS) version check. The pre-conditions 212b may be in a form of command line interface (CLI) commands for the second device 112b.

The attributes 212a-d may further include rules 212c. The rules 212c involve a detection logic to determine if the issue is present in the second device 112b. The rules 212c indicate how to detect the issue based on collected data (symptoms). The rules 212c may be in a form of regular expressions or variable driven. The rules 212c may use logic such as and/or/not to combine various symptoms. The rules 212c include logic to generate IC results i.e., detect whether the issue exists in the second device 112b based on analyzing the detected symptoms.

The attributes 212a-d may further include remediation 212d. The remediation 212d may be human readable or machine executable instructions to fix or work around the detected issue. For example, the IC system 120 may include instructions to provide some or all of the IC results to an operator or an automated system run by the operator e.g., a network management system with logic to react and respond to the issues in the second device 112b. The operator may apply changes to the second device 112b based on recommendations in the remediation 212d or the network management system may reconfigure the second device 112b based on the remediation 212d e.g., automatically change one or more configuration parameters by enabling or disabling features, installing software, etc.

The attributes 212a-d are non-limiting examples of information included in the digitized IC signature 210. The information in IC signatures may vary widely based on a particular deployment and use case scenario.

At 206, the IC system 120 uses the collected data and one or more digitized IC signatures, e.g., from the IC database 126, to programmatically determine logic to execute based on the characteristics of the second device 112b i.e., applicable signatures. When an issue is detected, the IC system 120 determines an estimated shelf-life for the issue and uses the shelf-life to set next data collections and/or the redetection of the issue. Specifically, the IC system 120 will not collect data for signatures that are within their shelf-life i.e., that have active shelf-life. The IC system 120 will collect data for signatures that are expired or about to expire (approximately at an expiration date).

To estimate the shelf-life for a particular issue, a number of factors are considered. One factor involves the frequency of data change. If the symptom being collected relates to an operating state of the second device 112b e.g., CPU usage rate, it may change continuously. The telemetry data may be obtained frequently (e.g., every 60 seconds) and is indicative of an issue with an approximately short shelf-life. On the other hand, if the symptom being collected relates to a configuration parameter in the second device 112b e.g., on/off bit for a device feature, it may change daily, weekly, monthly, quarterly, and/or annually based on an enterprise network policy. As such, the configuration data may be obtained rarely (e.g., based on an upgrade of the second device 112b); the shelf-life is approximately long such as 24 hours.

However, frequency of a symptom data change while helpful, by itself may not be sufficient to determine shelf-life of the issue. Another factor that may be helpful to consider is a sampling rate. While data may be changing at one rate, the sampling rate may be different (i.e., the frequency with which the data is collected and provided to the IC system 120 for analysis can vary widely). The IC system 120 considers both (the frequency of the data change and the sampling rate) when calculating the shelf-life for the issue.

In one example embodiment, the sampling rate may be a factor adjustable by the user via the network management system. However, the sampling rate is typically dictated by other factors and is typically set as part of a broader data collection schedule and strategy of an enterprise network (i.e., the computing system 110). The IC system 120 uses the sampling rate along with the frequency of data change or rate of change of the data (e.g., telemetry data vs. configuration data) to determine the shelf-life for the issue.

That IC system 120 may further consider time since initial detection of the issue (time duration since last data collection in which the issue was detected). Time duration of the issue plays a role in estimating the shelf-life since the likelihood of change increases as more time passes since last data collection in which the issue was detected.

Additionally, the IC system 120 may consider detectability of the issue i.e., a first probability value of a likelihood that the issue is detectable based on the data indicating a set of symptoms in the computing system. That is, the efficacy of the signatures used to detect the issue can vary from one issue to another. The degree of detectability depends on the availability of the data required to detect all of the symptoms that identify the presence of the issue in the second device 112b. An issue is less likely to be detected (a low first probability) when some of the symptoms are present while others are unavailable because of the lack of data. Once the issue is first detected during last data collection, the first probability (likelihood that the issue can be detected based on the collected data) is used as the base for estimating the shelf-life of the detected issue.

The IC system 120 may further consider a second probability of the likelihood of the issue being a self-remediating issue i.e., disappearing from the second device 112b on its own. Specifically, an analysis of the production network data where problems detected using digitized knowledge has shown that some types of problems will be fixed on their own as a result of a change that was not in response to the detected problem (such as a planned upgrade or a system reboot), or a change initiated by the detection of the problem. The second probability of the likelihood that a detected issue will remediate on its own impacts the shelf-life.

An issue with a higher rate of self-remediation increases the decay rate (resulting in a re-evaluation and data collection sooner) and has a shorter shelf-life than an issue with a lower rate of self-remediation. For example, a CPU usage spike has a high second probability because it may self-remediate by killing one or more processes executing on second device 112b. It has a short shelf-life e.g., approximately one minute. On the other hand, a misconfiguration of the second device 112b e.g., wrong software installed, has a low second probability because it is unlikely to self-remediate. It has a long shelf-life e.g., approximately one day. That is, the second probability or self-remediation probability can initially be established based the nature of the data being used to detect the issue. Signatures that employ symptom detection based on operational or telemetry data (such as CPU, Memory, and throughput of second device 112b) have a greater likelihood of correcting themselves due to changes in utilization of network services.

The IC system 120 further considers a third probability of whether the issue can occur in the second device 112b i.e., occurrence probability. Issues can occur as a function of use or configuration of the second device 112b in a manner that would lead to the issue occurring, the number of devices in the computing system 110 of FIG. 1 that are susceptible to the issue, etc. These factors are combined to produce the third probability of whether the issue can occur in the second device 112b.

In one or more example embodiment, it may be helpful to adjust the next data collection so that it occurs just prior to the expiration of the shelf-life of the issue i.e., before the issue is remediated or no longer present in the second device 112b. That is, data may be collected when the issue is about to expire and not when it is no longer present. For example, a product "sell by date" i.e., the shelf-life of an IC result, depends on a decision by a consumer. In one or more example embodiments, users may establish, either by signature, signature group, or globally, the target for the probability of an anomaly being present and when the symptom data is to be recollected and analyzed i.e., a predetermined threshold value. The predetermined threshold value may be based on a decay rate of the issue. That is, the IC system 120 determines the decay rate of the issue and uses the set threshold value e.g., when the decay rate is about to reach 90%, perform the next data collection.

Figure 3:
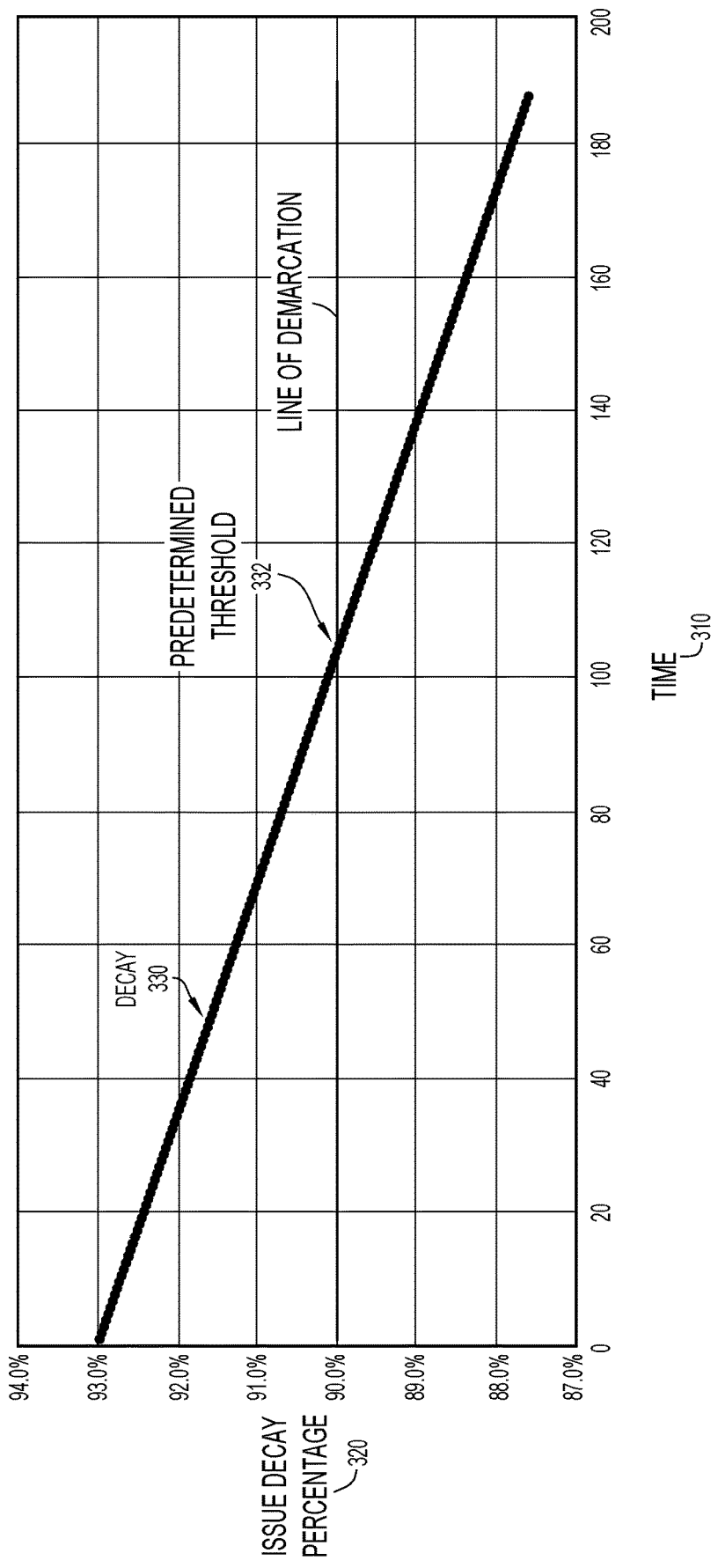
FIG. 3 is a view illustrating a graph of a decay rate of a detected issue that relates to an anomaly in configuration and/or operations of a computing system including a predetermined threshold value for next data collection, according to an example embodiment.

With continued reference to FIGS. 1 and 2, FIG. 3 is a view illustrating a graph 300 of a decay rate of a detected issue that relates to an anomaly in a configuration and/or operations of a computing system including a predetermined threshold value for next data collection, according to an example embodiment. The graph 300 includes time 310 in an x-axis (e.g., in seconds) and issue decay percentage 320 on a y-axis. The line 330 is a demarcation line indicative of the decay rate of the issue with respect to time. A predetermined threshold 332 is set on the line 330.

In one example embodiment, the predetermined threshold 332 is set at 90% indicative of an end of the shelf-life for the detected issue. The predetermined threshold 332 serves as a trigger for performing the next data collection i.e., the next data collection is performed when the decay rate for the issue reaches or approximates the predetermined threshold 332, which is the point at which the issue's presence should be re-evaluated. The data to re-analyze the anomaly is fed to the data collection capability to schedule the collection of the data by one or more of the plurality of data collection agents 122a-m of FIG. 1.

In one or more example embodiments, the IC system 120 determines the shelf-life for the issue by determining a decay rate that indicates a probability of a change in whether the issue is present in the computing system 110 with respect to time since the anomaly was detected (the time duration or the time 310). The decay rate is calculated based on one or more factors described above. In one example embodiment, the IC system 120 may use the following formula to calculate the decay rate for a signature:

$$p_t = ((e_t + (e_t - d_t) + (e_t - f_t))/3) * (c_t * (a_t/b_t)),$$

where p is the calculated probability at a particular point in time indicative of a change in whether the issue is still present or occurring the computing system 110 and/or the second device 112b. P is the probability that there has been a change in the issue status and whether the issue is to be analyzed again (i.e., whether data collection and issue detection are to be performed by the IC system 120).

a is a rate of change of the data for the issue symptom (e.g., a signature may include multiple different symptom data). The rate of change for the most frequently changing data/symptom is included in the formula.

b is a sampling rate of "a".

c is time since issue is detected. C may be an abstract unit in seconds. It introduces randomness and indicates the time duration since the last data collection in which the issue was detected.

d is a second probability (described above) of a likelihood of the issue being a self-remediating issue.

e is a first probability (described above) of a likelihood of the signature detecting the issue. In one example embodiment, this can be established by the signature creator (user) and/or calculated based on real world data.

f is a third probability (described above) of a likelihood of the issue occurring in the computing system 110 and/or the second device 112b.

In the graph 300, the values used to calculate the decay rate are:
a—5 seconds
b—5 minutes c—time since detection (abstract unit) in seconds, introduction of randomness d—0.05 e—0.95 f—0.01 p—the probability that there has been a change in the issue status and the issue is to be analyzed again. The line 330 indicates p with respect to time since the issue is detected.

In this example, the shelf-life for the signature result (the issue) is 49 minutes and 10 seconds. The next data collection is set at 49 minutes and 10 seconds. The IC system 120 will then perform data analysis and issue detection based on the next data collection.

In one example embodiment, the probability that there is a change in whether an issue is present or is no longer present in the computing system 110 and/or the second device 112b and is to be redetected is based on the average of (1) the first probability (the likelihood that the issue can be detected based on collected data that indicate a set of symptoms present in the computing system 110 and/or second device 112b), (2) the second probability of the likelihood that the issue has been self-remediated, and (3) the third probability of the likelihood that the issue will occur in general in the computing system 110 and/or the second device 112b. The discrepancy between the rate of the data change and the sampling rate is multiplied by the time since detection (time duration) to account for time since initial detection of the issue (e.g., last data collection) and the loss of data.

For example, the IC system 120 collects telemetry data from second device 112b, which is a signature that looks at CPU utilization to determine if there is an issue with the second device 112b. Since CPU utilization changes constantly, there is a high likelihood of the issue self-correcting (high second probability of self-remediation). That is, the CPU usages fluctuates as a function of the device usage. On the other hand, there is a certain likelihood that a high CPU usage is indicative of a "real" underlying issue with the second device 112b. Using the decay rate calculated by the IC system 120, for example, the IC system 120 determines how often, after a high CPU reading result is detected, the IC system 120 should check to see if the CPU reading is still high. That is, the operator and/or a signature generator sets the predetermined threshold 332 on the graph 300 indicative of when to check for whether the issue is still occurring at the second device 112b. If the predetermined threshold is set at 80% decay rate, the time between the predetermined threshold and when the issue was first detected is the time when the next data collection is to occur. In other words, the next data collection occurs when the predetermined threshold of 80% decay rate is reached or approximately reached.

As another example, the IC system 120 collects configurations data of the second device 112b i.e., a signature for feature settings in a showing running configuration that indicate that the second device 112b is susceptible to a certain network bug. If that value (or the configuration) is only changed every quarter, the issue is highly unlikely to self-remediate (low second probability), and the issue has a high probably of being present when the second device 112b is configured in that specific way. As such, the decay rate for the presence of the IC result (detected issue) is slow and the shelf-life is longer. For example, the next data collection is set to a month and half from the time the issue was detected. In other words, frequency of data collections to detect this issue is set to 1.5 months.

In one example embodiment, network management systems, which incorporate alert management logic and data collection capabilities, may further incorporate the determined shelf-life for the issues for improved management of their operations. For example, rules are generated to indicate that when an alert is initially detected, if the alert is for an issue with a short shelf-life, the system should wait for the alert to occur over a calculated time period before any action is to be taken. An issue with a long shelf-life has a higher priority for the network management systems because it is unlikely that the issue will self-remediate in the near term.

In one example embodiment, data collection uses shelf-life as an input into a device data collection system to dynamically adjust where the data is collected and the frequency of data collections. The data collections are thus more targeted and surgical, reducing the consumption of valuable computing and network resources.

The techniques presented herein determine how long a detected issue is likely to be present in a computing system (e.g., enterprise network) until a change in the presence of this issue will occur i.e., the issue being remediated or no longer being present.

In related art, detecting problems in enterprise networks using digitized IC typically involves a consistent, regular data collection and analysis process. This approach treats all of the problems equally and applies the probability of a problem occurring at time 0 being the same as the probability of the problem still occurring at time 1. In contrast, in one or more example embodiments, multiple factors are used to calculate and recalculate the probably of change occurring in the issue (shelf-life and/or decay rate). The data collection, transport, and analysis process utilizes less compute and network resources by only performing actions for the issues that have expired or are about to expire (reached the predetermined threshold of decay rate). The techniques presented herein provide for calculating a dynamic decay rate and shelf-life for an IC result to adjust data collections and make them more surgical i.e., specific to the detected issues with an expired shelf-life while skipping the detected issues with an active shelf-life.

Figure 4:
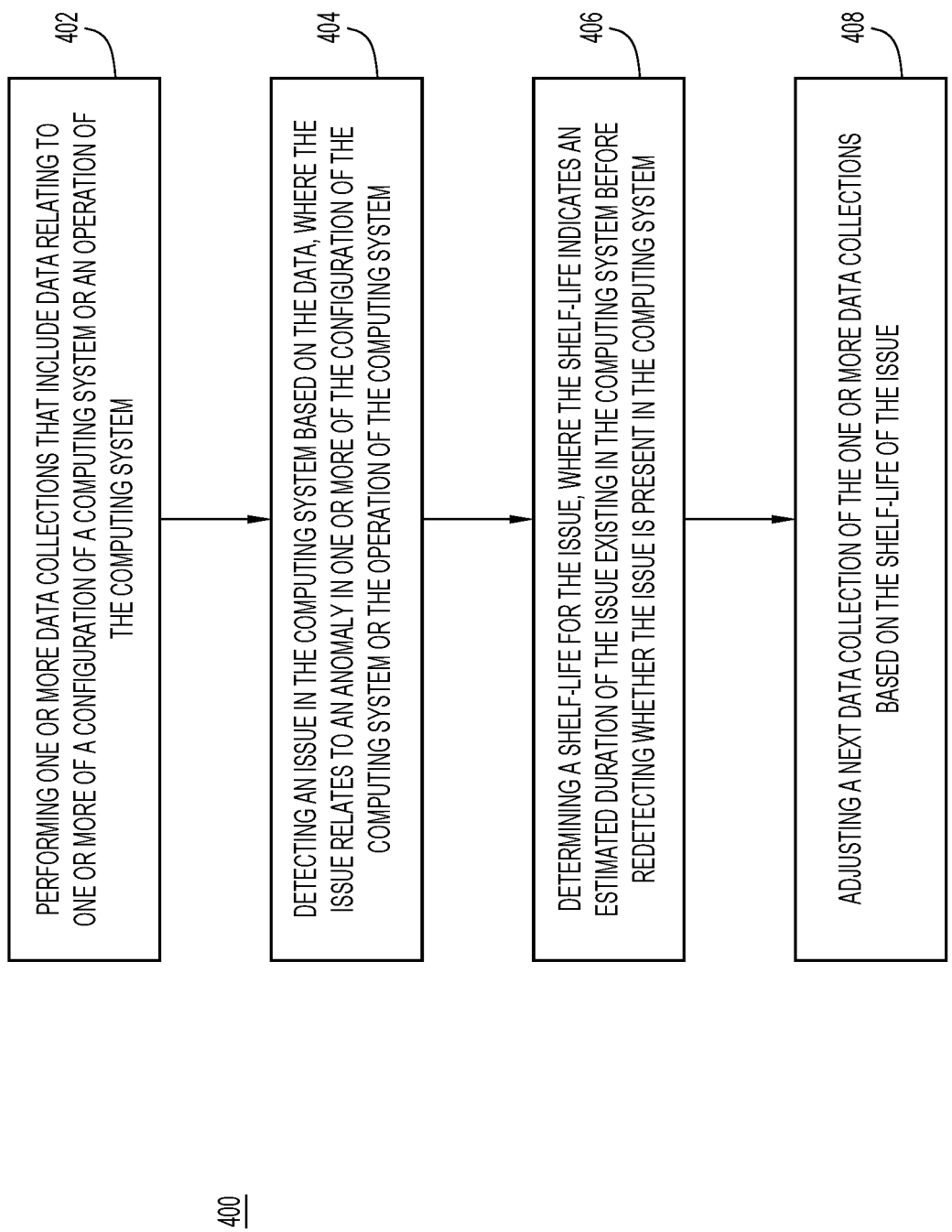
FIG. 4 is a flowchart illustrating a method of adjusting next data collection based on a determined shelf-life of an issue related to an anomaly in configuration and/or operations of a computing system, according to an example embodiment.

FIG. 4 is a flowchart illustrating a computer-implemented method 400 of adjusting next data collection based on a determined shelf-life of an issue related to an anomaly in configuration and/or operations of a computing system, according to an example embodiment. The computer-implemented method 400 may be performed by a computing device such as a server or a group of servers e.g., the IC system 120 of FIG. 1 or FIG. 2 such as the IC engines 124 of FIG. 1.

The computer-implemented method 400 involves, at 402, performing one or more data collections that include data relating to one or more of a configuration of a computing system or an operation of the computing system.

The computer-implemented method 400 further involve, at 404, detecting an issue in the computing system based on the data. The issue relates to an anomaly in one or more of the configuration of the computing system or the operation of the computing system.

The computer-implemented method 400 further involves at 406, determining a shelf-life for the issue. The shelf-life indicates an estimated duration of the issue existing in the computing system before redetecting whether the issue is present in the computing system.

Additionally, the computer-implemented method 400 involves at 408, adjusting a next data collection of the one or more data collections based on the shelf-life of the issue.

In one form, the operation 408 of adjusting the next data collection may include setting the next data collection to be approximately at an expiration of the shelf-life for the issue. The expiration of the shelf-life may be indicative of the issue being remediated or no longer being present in the computing system.

In another form, the one or more data collections may be performed periodically. The operation 408 of adjusting the next data collection may include skipping the next data collection of the one or more data collections while the shelf-life of the issue is active that is indicative of the issue being present in the computing system.

According to one or more example embodiments, the operation 406 of determining the shelf-life for the issue may include determining a decay rate for the issue. The decay rate may indicate a probability of a change in whether the issue is present in the computing system with respect to time since the issue is detected.

In one instance, the operation 408 of adjusting the next data collection may include setting the next data collection when the decay rate of the issue reaches a predetermined threshold.

In another instance, in the computer-implemented method 400, determining the decay rate may be based on one or more of: a rate of change of the data, a sampling rate for the data, a first probability of a likelihood that the issue is detectable based on the data indicating a set of symptoms in the computing system, a second probability of a likelihood that the issue is a self-remediating issue in the computing system, a third probability of whether the issue can occur in the computing system, or a time duration since a last data collection of the one or more data collections.

According to one or more example embodiments, in the computer-implemented method 400, the decay rate may be determined at least based on the first probability, the second probability, and the third probability and the operation 406 of determining the shelf-life for the issue may include determining an average of the first probability, the second probability, and a third probability.

According to one or more example embodiments, the operation 402 of performing the one or more data collections may include obtaining a first data set including a plurality of configuration parameters related to the configuration of the computing system to detect a first issue in the computing system and obtaining a second data set including telemetry data related to the operation of the computing system to detect a second issue in the computing system. The operation 408 of adjusting the next data collection may include skipping, in the next data collection, the first data set based on the shelf-life of the first issue while including the second data set based on the shelf-life of the second issue.

Figure 5:
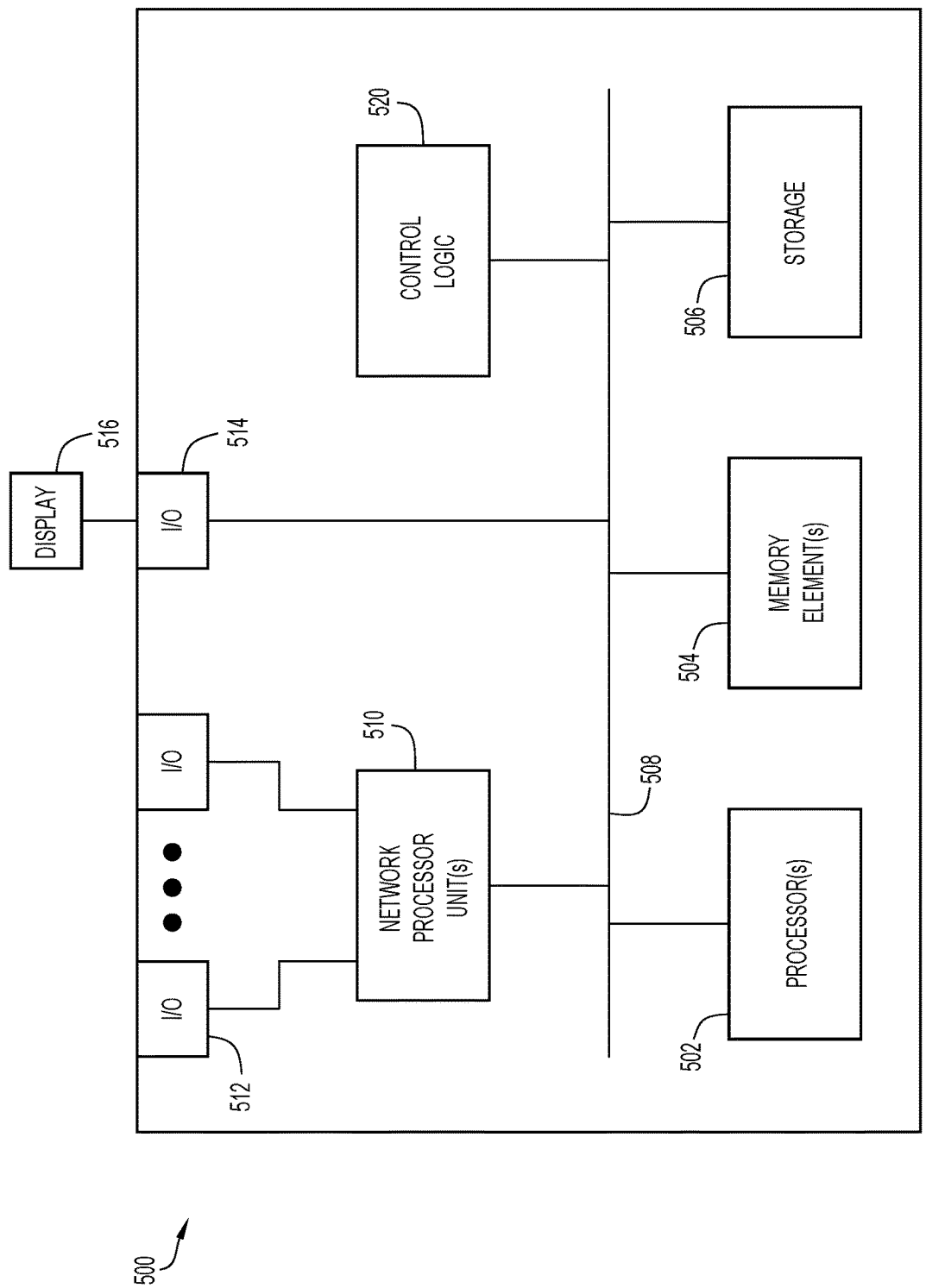
FIG. 5 is a hardware block diagram of a computing device that may perform functions associated with any combination of operations in connection with the techniques depicted and described in FIGS. 1-4, according to various example embodiments.

FIG. 5 is a hardware block diagram of a computing device 500 that may perform functions associated with any combination of operations in connection with the techniques depicted in FIGS. 1-4, according to various example embodiments, including, but not limited to, operations of the computing device or one or more servers that execute the IC system 120 and/or one of its components. Further, the computing device 500 may be representative of one of the network devices, network/computing equipment, or hardware asset of an enterprise such as one of the devices of the computing system 110. It should be appreciated that FIG. 5 provides only an illustration of one example embodiment and does not imply any limitations with respect to the environments in which different example embodiments may be implemented. Many modifications to the depicted environment may be made.

In at least one embodiment, computing device 500 may include one or more processor(s) 502, one or more memory element(s) 504, storage 506, a bus 508, one or more network processor unit(s) 510 interconnected with one or more network input/output (I/O) interface(s) 512, one or more I/O interface(s) 514, and control logic 520. In various embodiments, instructions associated with logic for computing device 500 can overlap in any manner and are not limited to the specific allocation of instructions and/or operations described herein.

In at least one embodiment, processor(s) 502 is/are at least one hardware processor configured to execute various tasks, operations and/or functions for computing device 500 as described herein according to software and/or instructions configured for computing device 500. Processor(s) 502 (e.g., a hardware processor) can execute any type of instructions associated with data to achieve the operations detailed herein. In one example, processor(s) 502 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, one or more memory element(s) 504 and/or storage 506 is/are configured to store data, information, software, and/or instructions associated with computing device 500, and/or logic configured for memory element(s) 504 and/or storage 506. For example, any logic described herein (e.g., control logic 520) can, in various embodiments, be stored for computing device 500 using any combination of memory element(s) 504 and/or storage 506. Note that in some embodiments, storage 506 can be consolidated with one or more memory elements 504 (or vice versa), or can overlap/exist in any other suitable manner.

In at least one embodiment, bus 508 can be configured as an interface that enables one or more elements of computing device 500 to communicate in order to exchange information and/or data. Bus 508 can be implemented with any architecture designed for passing control, data and/or information between processors, memory elements/storage, peripheral devices, and/or any other hardware and/or software components that may be configured for computing device 500. In at least one embodiment, bus 508 may be implemented as a fast kernel-hosted interconnect, potentially using shared memory between processes (e.g., logic), which can enable efficient communication paths between the processes.

In various embodiments, network processor unit(s) 510 may enable communication between computing device 500 and other systems, entities, etc., via network I/O interface(s) 512 to facilitate operations discussed for various embodiments described herein. In various embodiments, network processor unit(s) 510 can be configured as a combination of hardware and/or software, such as one or more Ethernet driver(s) and/or controller(s) or interface cards, Fibre Channel (e.g., optical) driver(s) and/or controller(s), and/or other similar network interface driver(s) and/or controller(s) now known or hereafter developed to enable communications between computing device 500 and other systems, entities, etc. to facilitate operations for various embodiments described herein. In various embodiments, network I/O interface(s) 512 can be configured as one or more Ethernet port(s), Fibre Channel ports, and/or any other I/O port(s) now known or hereafter developed. Thus, the network processor unit(s) 510 and/or network I/O interface(s) 512 may include suitable interfaces for receiving, transmitting, and/or otherwise communicating data and/or information in a network environment.

I/O interface(s) 514 allow for input and output of data and/or information with other entities that may be connected to computing device 500. For example, I/O interface(s) 514 may provide a connection to external devices such as a keyboard, keypad, a touch screen, and/or any other suitable input device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a display 516 such as a computer monitor, a display screen, or the like.

In various embodiments, control logic 520 can include instructions that, when executed, cause processor(s) 502 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

In another example embodiment, an apparatus is provided. The apparatus includes a memory, a network interface configured to enable network communications, and a processor. The processor is configured to perform a method including performing one or more data collections that include data relating to one or more of a configuration of a computing system or an operation of the computing system. The method further involves detecting an issue in the computing system based on the data. The issue relates to an anomaly in one or more of the configuration of the computing system or the operation of the computing system. The method further involves determining a shelf-life for the issue. The shelf-life indicates an estimated duration of the issue existing in the computing system before redetecting whether the issue is present in the computing system. The method further involves adjusting a next data collection of the one or more data collections based on the shelf-life of the issue.

In yet another example embodiment, one or more non-transitory computer readable storage media encoded with instructions are provided. When the media is executed by a processor, the instructions cause the processor to execute a method that includes performing one or more data collections that include data relating to one or more of a configuration of a computing system or an operation of the computing system and detecting an issue in the computing system based on the data. The issue relates to an anomaly in one or more of the configuration of the computing system or the operation of the computing system. The method further includes determining a shelf-life for the issue. The shelf-life indicates an estimated duration of the issue existing in the computing system before redetecting whether the issue is present in the computing system. The method further includes adjusting a next data collection of the one or more data collections based on the shelf-life of the issue.

In yet another example embodiment, a system is provided that includes the devices and operations explained above with reference to FIGS. 1-5.

The programs described herein (e.g., control logic 520) may be identified based upon the application(s) for which they are implemented in a specific embodiment. However, it should be appreciated that any particular program nomenclature herein is used merely for convenience, and thus the embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, the storage 506 and/or memory elements(s) 504 can store data, software, code, instructions (e.g., processor instructions), logic, parameters, combinations thereof, and/or the like used for operations described herein. This includes the storage 506 and/or memory elements(s) 504 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein, the terms may be used in a generic sense to include packets, frames, segments, datagrams, and/or any other generic units that may be used to transmit communications in a network environment. Generally, the terms reference to a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data, or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

Each example embodiment disclosed herein has been included to present one or more different features. However, all disclosed example embodiments are designed to work together as part of a single larger system or method. This disclosure explicitly envisions compound embodiments that combine multiple previously discussed features in different example embodiments into a single system or method.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A computer-implemented method comprising:
performing one or more data collections that include data relating to one or more of a configuration of a computing system or an operation of the computing system;
detecting an issue in the computing system based on the data, wherein the issue relates to an anomaly in one or more of the configuration of the computing system or the operation of the computing system;
determining a shelf-life for the issue at least based on a self-remediation factor indicative of a probability whether the issue is a self-remediating issue, wherein the shelf-life indicates an estimated duration of the issue existing in the computing system before the issue is remedied or is no longer present in the computing system; and
adjusting a next data collection of the one or more data collections based on the shelf-life of the issue.

2. The computer-implemented method of claim 1, wherein adjusting the next data collection includes:
setting the next data collection to be approximately at an expiration of the shelf-life for the issue, wherein the expiration of the shelf-life is indicative of the issue being remediated or no longer being present in the computing system.

3. The computer-implemented method of claim 1, wherein the one or more data collections are performed periodically, and adjusting the next data collection includes:
skipping the next data collection of the one or more data collections while the shelf-life of the issue is indicative of the issue being present in the computing system.

4. The computer-implemented method of claim 1, wherein determining the shelf-life for the issue includes:
determining a decay rate for the issue, wherein the decay rate indicates a probability of a change in whether the issue is present in the computing system with respect to time since the issue is detected.

5. The computer-implemented method of claim 4, wherein adjusting the next data collection includes:
setting the next data collection when the decay rate of the issue reaches a predetermined threshold.

6. The computer-implemented method of claim 4, wherein determining the decay rate is based on one or more of:
a rate of change of the data,
a sampling rate for the data,
a first probability of a likelihood that the issue is detectable based on the data indicating a set of symptoms in the computing system,
a second probability of the likelihood that the issue is the self-remediating issue in the computing system,
a third probability of whether the issue can occur in the computing system, or
a time duration since a last data collection of the one or more data collections.

7. The computer-implemented method of claim 1, wherein performing the one or more data collections includes:
obtaining a first data set including a plurality of configuration parameters related to the configuration of the computing system to detect a first issue in the computing system; and
obtaining a second data set including telemetry data related to the operation of the computing system to detect a second issue in the computing system,
wherein adjusting the next data collection includes skipping, in the next data collection, the first data set based on the shelf-life of the first issue while including the second data set based on the shelf-life of the second issue.

8. The computer-implemented method of claim 1, wherein determining the shelf-life of the issue includes:
determining a decay rate for the issue at least based on a first probability of a likelihood of detecting the issue based on the data and a second probability of the likelihood of the issue to occur in the computing system; and
determining the shelf-life of the issue by averaging the first probability and the second probability.

9. The computer-implemented method of claim 1, wherein adjusting the next data collection includes:
generating an adjusted set of code modules by subtracting, from a set of code modules, one or more code modules for one or more issues detected to have an active shelf-life, wherein each code module is configured to collect telemetry data types for detecting a respective issue; and
executing the adjusted set of code modules for detecting at least one other issue.

10. The computer-implemented method of claim 9, further comprising:
obtaining a plurality of signatures, each signature defines the respective issue to detect, the telemetry data types to collect for detecting the respective issue, one or more code modules to collect the telemetry data types, one or more pre-conditions to apply when detecting the respective issue, one or more rules for detecting the respective issue based on the data, and at least one remediating action to remediate the respective issue.

11. A computer-implemented method comprising:
performing one or more data collections that include data relating to one or more of a configuration of a computing system or an operation of the computing system;
detecting an issue in the computing system based on the data, wherein the issue relates to an anomaly in one or more of the configuration of the computing system or the operation of the computing system;
determining a shelf-life for the issue, wherein the shelf-life indicates an estimated duration of the issue existing in the computing system before the issue is remedied or is no longer present in the computing system and wherein determining the shelf-life for the issue includes determining a decay rate for the issue based on one or more of: a rate of change of the data, a sampling rate for the data, a first probability of a likelihood that the issue is detectable based on the data indicating a set of symptoms in the computing system, a second probability of a likelihood that the issue is a self-remediating issue in the computing system, a third probability of whether the issue can occur in the computing system, or a time duration since a last data collection of the one or more data collections, wherein the decay rate indicating a probability of a change in whether the issue is present in the computing system with respect to time since the issue is detected; and
adjusting a next data collection of the one or more data collections based on the shelf-life of the issue,
wherein the decay rate is determined at least based on the first probability, the second probability, and the third probability and determining the shelf-life for the issue includes:
determining an average of the first probability, the second probability, and the third probability.

12. The computer-implemented method of claim 11, wherein performing the one or more data collections includes:
- obtaining a first data set including a plurality of configuration parameters related to the configuration of the computing system to detect a first issue in the computing system; and
- obtaining a second data set including telemetry data related to the operation of the computing system to detect a second issue in the computing system,
- wherein adjusting the next data collection includes skipping, in the next data collection, the first data set based on the shelf-life of the first issue while including the second data set based on the shelf-life of the second issue.

13. The computer-implemented method of claim 11, wherein adjusting the next data collection includes:
- setting the next data collection when the decay rate of the issue reaches a predetermined threshold.

14. An apparatus comprising:
- a memory;
- a network interface configured to enable network communications; and
- a processor, wherein the processor is configured to perform a method comprising:
  - performing one or more data collections that include data relating to one or more of a configuration of a computing system or an operation of the computing system;
  - detecting an issue in the computing system based on the data, wherein the issue relates to an anomaly in one or more of the configuration of the computing system or the operation of the computing system;
  - determining a shelf-life for the issue based at least on a self-remediation factor indicative of a probability whether the issue is a self-remediating issue, wherein the shelf-life indicates an estimated duration of the issue existing in the computing system before the issue is remedied or is no longer present in the computing system; and
  - adjusting a next data collection of the one or more data collections based on the shelf-life of the issue.

15. The apparatus of claim 14, wherein the processor is configured to adjust the next data collection by:
- setting the next data collection to be approximately at an expiration of the shelf-life for the issue, wherein the expiration of the shelf-life is indicative of the issue being remediated or no longer being present in the computing system.

16. The apparatus of claim 14, wherein the one or more data collections are performed periodically, and the processor is configured to adjust the next data collection by:
- skipping the next data collection of the one or more data collections while the shelf-life of the issue is indicative of the issue being present in the computing system.

17. The apparatus of claim 14, wherein the processor is configured to determine the shelf-life for the issue by:
- determining a decay rate for the issue, wherein the decay rate indicates a probability of a change in whether the issue is present in the computing system with respect to time since the issue is detected.

18. The apparatus of claim 17, wherein the processor is configured to adjust the next data collection by:
- setting the next data collection when the decay rate of the issue reaches a predetermined threshold.

19. The apparatus of claim 17, wherein the processor is configured to determine the decay rate based on one or more of:
- a rate of change of the data,
- a sampling rate for the data,
- a first probability of a likelihood that the issue is detectable based on the data indicating a set of symptoms in the computing system,
- a second probability of the likelihood that the issue is the self-remediating issue in the computing system,
- a third probability of whether the issue can occur in the computing system, or
- a time duration since a last data collection of the one or more data collections.

20. The apparatus of claim 19, wherein the processor is configured to determine the decay rate at least based on the first probability, the second probability, and the third probability and the processor is configured to determine the shelf-life for the issue by:
- determining an average of the first probability, the second probability, and the third probability.

* * * * *